3,061,608
PREPARATION OF HEXAMETHYLENE-
TETRAMINE
Allen F. Millikan, Crystal Lake, Ill., assignor to The Pure Oil Company, Chicago, Ill., a corporation of Ohio
No Drawing. Filed June 1, 1960, Ser. No. 33,094
9 Claims. (Cl. 260—248.6)

This invention relates to new and useful improvements in methods for the preparation of hexamethylenetetramine in substantially pure anhydrous form.

Hexamethylenetetramine is generally manufactured on a commercial scale by passing gaseous ammonia into a concentrated aqueous formaldehyde solution and evaporating the same. The temperature of the reaction mixture must be kept low by cooling to prevent side reactions and to produce a high yield. Evaporation of the water is generally conducted under reduced pressure and small additional quantities of ammonia must be passed in to make up for the ammonia which is split off from the hexamethylenetetramine by hydrolysis.

The commercial method of preparation of hexamethylenetetramine has several disadvantages which are overcome by the present invention. Hexamethylenetetramine has a very strong affinity for water and gives up the last traces of water very slowly, even though a high vacuum be employed. Also, there is a tendency for formation of a sludge during concentration of hexamethylenetetramine by evaporation which settles and cakes on the apparatus and can be removed only with difficulty. The removal of hexamethylenetetramine from the evaporator must be carried out while the product is still moist and the final drying is usually conducted in large drying ovens. Previous investigators have proposed various techniques for modifying the commercial process for the preparation of hexamethylenetetramine to make the process easier to carry out and more economical. Ludwig, Patent 2,865,919, discloses a process for gas-phase reaction of formaldehyde and ammonia at a temperature between the dew point of water and the desublimation temperature of hexamethylenetetramine so that the hexamethylenetetramine condenses and is recovered as a dry product. Novotny et al. in Patent 2,293,619, disclose a process in which a hexamethylenetetramine-water composition is passed into a non-volatile liquid in which neither the hexamethylenetetramine nor water is soluble. By this procedure, it is claimed that the volatile constituents of the solution are removed in the gaseous state and solid hexamethylenetetramine is left in the liquid from which it is separated. Both of these processes are complex and costly.

It is one object of the invention to provide a new and improved process for the preparation of hexamethylenetetramine.

Another object is to provide a process for preparing hexamethylenetetramine in high yield and in a high state of purity.

A feature of this invention is the provision of a new and improved process for the preparation of hexamethylenetetramine by reaction of paraformaldehyde with ammonia.

Another feature of this invention is the provision of an improved process for the preparation of hexamethylenetetramine by reaction of paraformaldehyde with ammonia in dispersion in a light hydrocarbon, followed by recovery (and drying, if necessary) of the hexamethylenetetramine precipitate which forms.

Other objects and features of this invention will become apparent from time to time throughout the specification and claims as hereinafter related.

This invention is based upon my discovery that paraformaldehyde can be reacted with ammonia in suspension in a light hydrocarbon solvent as reaction medium to produce hexamethylenetetramine in high yields. Because the only water involved in the process is that produced by the reaction, the product recovery is extremely simple as compared to prior art processes. In my process, 4 mols of ammonia are reacted with 6 mols of formaldehyde (in the form of paraformaldehyde) in suspension in a light hydrocarbon to form 1 mol of hexamethylenetetramine and 6 mols of by-product water. In general, the ammonia - paraformaldehyde - hydrocarbon mixture is merely heated to form the hexamethylenetetramine. However, a small amount of catalyst may aid in the reaction. For example, it appears that a small amount of a dialkyldithiophosphoric acid (e.g., dioctyldithiophosphoric acid) which, because of its solubility in oil, does not contaminate the oil-insoluble product, may be added to the reaction mixture to facilitate the formation of hexamethylenetetramine. In my process, the hexamethylenetetramine, because of its insolubility in oil, precipitates from the reaction effluent and can be separated by simple filtration, centrifugation, or other equivalent means. The filter cake may contain small amounts of water, in which case a simple drying step is required. Also, the relatively small amount of water produced by the reaction may contain a sufficient amount of dissolved hexamethylenetetramine to warrant the inclusion of a step to recover the product therefrom by evaporation. Because the amount of water is so much smaller than the amounts involved in prior art processes, this process is still much simpler and more efficient, even when a final evaporation step is included.

In carrying out this process, solid paraformaldehyde is dispersed in a light hydrocarbon and dry ammonia gas is bubbled therethrough. The hydrocarbon which is used as the reaction medium may be any suitable light hydrocarbon, such as light mineral oils, or pure hydrocarbons, such as pentane, hexane, benzene, toluene, etc. The reaction between ammonia and paraformaldehyde is highly exothermic and the reaction temperature rises to about 50°–90° C., depending upon the kind and amount of hydrocarbon reaction medium used. The reaction is preferably carried out at the boiling point of the water-hydrocarbon azeotrope, or under conditions of total reflux for the pure hydrocarbon to facilitate removal of by-product water.

The following non-limiting examples are illustrative of the scope of this invention.

*Example I*

A slurry of 60.0 g. (2.0 mols) of paraformaldehyde in 500 ml. of toluene was formed in a liter flask equipped with mercury-sealed stirrer, a tube for delivering ammonia below the liquid surface, a thermometer for measuring liquid temperature, and a reflux condenser over a water trap. Anhydrous ammonia was introduced through the gas-delivery tube as the reaction mixture was stirred. The heat of reaction raised the temperature to 60° C. and additional heat was supplied with a heating mantle to bring the system to reflux. The reaction was continued for 1 hour, 15 minutes. At the end of this time, 39.5 ml. of aqueous phase had been collected in the trap. This volume was somewhat more than theory (36 ml.) as the water had some ammonia dissolved therein, reducing the specific gravity. 39.2 g. of crystalline hexamethylenetetramine was separated by filtration. The product represented a yield of 84% of theory. The product was analyzed and found to contain 39.6% nitrogen, compared to the theoretical content of 40.0%.

*Example II*

A slurry of 60.1 g. (2.0 mols) of paraformaldehyde, 1.6 g. of O,O'-di-2-ethylhexyl phosphorodithioic acid (as catalyst), and 500 ml. of toluene was formed in a liter flask equipped in the manner described in Example I above. Anhydrous ammonia was introduced through the gas-delivery tube as the reaction mixture was stirred. In 20 minutes, the temperature had risen to 60° C., and the reaction was continued with stirring and additional heat (to bring the system to reflux) for an additional hour and 40 minutes. During the reaction period, 40.5 ml. of aqueous phase was collected in the trap. The volume exceeded theory (36 ml.) because of dissolved ammonia. 44.4 g. of crystalline hexamethylenetetramine (a yield of 95% of theory) was recovered by filtration. The product was analyzed and found to contain 39.4% nitrogen and less than 0.01% phosphorus, thus indicating a product purity of about 99%.

*Example III*

A slurry of 3 mols of formaldehyde, as paraformaldehyde, is formed in about 400 ml. of 85 vis. neutral oil, using mechanical agitation. Anhydrous ammonia is bubbled through the suspension, and the mixture is stirred for a period of 2 hours. The amount of ammonia bubbled through the suspension is several times the stoichiometric amount required for reaction with the paraformaldehyde. An exothermic reaction takes place during this period which is sufficient to raise the temperature of the mixture to about 80° C. early in the reaction period. Additional heat is supplied to raise the temperature to over 100° C. and remove by-product water. All of the paraformaldehyde is consumed during the reaction period and hexamethylenetetramine is formed as fine white crystals which settle to the bottom of the reactor. Using this procedure, the paraformaldehyde is converted quantitatively to hexamethylenetetramine and is recovered by filtration as the anhydrous, pure compound.

*Example IV*

A slurry of 3 mols of formaldehyde, as paraformaldehyde, in n-pentane is prepared in a flask equipped with a stirrer, a water-cooled condenser, and water trap, while maintaining conditions of total reflux for n-pentane vapor, i.e., maintaining a temperature of 35.5°–36.0° C. Ammonia is bubbled through the paraformaldehyde slurry and the mixture is agitated for a period of about 2 hours. The reaction between ammonia and paraformaldehyde is highly exothermic and helps to keep the temperature of the mixture at the boiling point of the n-pentane. A small amount of additional heat is required to remove by-product water of reaction which forms an azeotrope with n-pentane boiling at 34.9° C. This azeotrope is refluxed in the condenser with the trapped water while the n-pentane vapors are condensed and returned to the reactor. By carrying out the reaction in this manner, the water of reaction is removed from the reactor as the pentane-water azeotrope. As in Example I, hexamethylenetetramine is formed almost quantitatively as white crystals which settle to the bottom of the reactor. The hexamethylenetetramine crystals are recovered by filtration, and residual solvent is removed by evaporation.

As is illustrated in the above example, it is preferred to carry out the reaction of ammonia with paraformaldehyde at a temperature which is about that of the boiling point of the water-hydrocarbon azeotrope or at a temperature between the boiling point of the water-hydrocarbon azeotrope and the boiling point of the pure hydrocarbon in which the reaction is carried out. This may be accomplished by carrying out the reaction in a distillation column with a water trap wherein the water-hydrocarbon azeotrope is separated by fractional distillation, and the pure hydrocarbon is returned as reflux to the reactor. The reaction may also be carried out using a simple reflux condenser arranged to maintain a temperature such that the pure hydrocarbon is condensed and returned to the reactor. When n-hexane is substituted as the reaction medium in the process described above, the reaction is preferably carried out at a temperature of about 61.5° C., the boiling point of the water-hexane azeotrope, or in the range from 61.5° to 69° C., the boiling point of n-hexane. When benzene is substituted as the reaction medium, the reaction is preferably carried out at a temperature between 69° C., the boiling point of the benzene-water azeotrope, and 80° C., the boiling point of benzene. When cyclohexane is substituted as the reaction medium, the reaction temperature is preferably between 69° and 81° C. When toluene is substituted as the reaction medium, the temperature of reaction is preferably between 84° and 110° C. Likewise, n-heptane may be used as the reaction medium at temperatures of 80°–98° C., n-octane at temperatures of 89.5°–125° C., or n-decane at 97°–173° C., in each case the lower temperature being the boiling point of the hydrocarbon-water azeotrope and the higher temperature the boiling point of the hydrocarbon.

While I have described this invention fully and completely with special emphasis upon several preferred embodiments thereof, I wish it to be understood that within the scope of the appended claims, this invention may be practiced otherwise than as specifically described herein.

The embodiments of the invention in which an exclusive property or privilege is claimed are defined as follows:

1. A method of preparing hexamethylenetetramine which comprises bubbling anhydrous gaseous ammonia through a dispersion of particles of paraformaldehyde in a light hydrocarbon selected from the group consisting of aromatic hydrocarbons and saturated aliphatic hydrocarbons, the water of reaction and said hydrocarbon forming a water-hydrocarbon azeotrope, carrying out the reaction at a temperature within the range from about the boiling point of said water-hydrocarbon azeotrope to the boiling point of said hydrocarbon whereby to produce a precipitate of hexamethylenetetramine, and mechanically separating the hexamethylenetetramine thus produced.

2. A method according to claim 1 which the reaction is carried out at the boiling point of the water-hydrocarbon azeotrope.

3. A method according to claim 1 in which the reaction is carried out in the presence of a dialkyldithio-phosphoric acid catalyst.

4. A method according to claim 2 in which the water of reaction is removed as a water-hydrocarbon azeotrope.

5. A method according to claim 1 in which the hydrocarbon is a light mineral oil.

6. A method according to claim 1 in which the hydrocarbon is pentane.

7. A method according to claim 1 in which the hydrocarbon is hexane.

8. A method according to claim 1 in which the hydrocarbon is benzene.

9. A method according to claim 1 in which the hydrocarbon is toluene.

References Cited in the file of this patent

UNITED STATES PATENTS

| | | |
|---|---|---|
| 1,774,929 | Landt et al. | Sept. 2, 1930 |
| 2,293,619 | Novotny et al. | Aug. 18, 1942 |
| 2,297,531 | Bock | Sept. 29, 1942 |

FOREIGN PATENTS

| | | |
|---|---|---|
| 1,167,435 | France | Aug. 11, 1958 |

OTHER REFERENCES

MacArdle: The Use of Solvents in Synthetic Organic Chemistry, pages 7 to 9, D. Van Nostrand Co., New York (1925).

Chemical Abstracts, vol. 31, col. 7395 (1937).

Bergmann: The Chemistry of Acetylene and Related Compounds, page 80, Interscience Publishers, Inc., New York (1948).

Walker: "Formaldehyde," 2nd ed., pub. by Reinhold Pub. Co., New York, 1953, ACS Monograph Series, pages 409–410.